United States Patent

Takahashi et al.

[11] Patent Number: 5,461,087
[45] Date of Patent: Oct. 24, 1995

[54] ADHESIVE AND DOUBLE-SIDED ADHESIVE TAPE

[75] Inventors: Satoshi Takahashi; Ikuo Mitushima, both of Tochigi, Japan

[73] Assignee: Sony Corporation, Tokyo, Japan

[21] Appl. No.: 98,824

[22] Filed: Jul. 29, 1993

[30] Foreign Application Priority Data

Aug. 3, 1992 [JP] Japan .................................. 4-226477

[51] Int. Cl.[6] .............................. C09J 11/04; C09J 11/08; C09J 129/10; C09J 133/08
[52] U.S. Cl. .................. 522/80; 522/83; 522/181; 522/182; 522/183; 522/184; 524/853; 524/854; 525/303
[58] Field of Search .................... 526/320, 313; 428/355; 522/80, 83, 179, 181, 182, 183, 184; 524/853, 854; 525/303

[56] References Cited

U.S. PATENT DOCUMENTS

| | | | |
|---|---|---|---|
| Re. 24,906 | 12/1960 | Ulrich | 206/59 |
| 3,725,122 | 4/1973 | Reinhard et al. | 526/320 X |
| 3,770,708 | 11/1973 | Knoepfel et al. | 526/320 X |
| 3,971,766 | 7/1976 | Ono et al. | 526/320 X |
| 4,737,559 | 4/1988 | Kellen et al. | 526/313 X |
| 4,925,908 | 5/1990 | Bernard et al. | 526/320 |

FOREIGN PATENT DOCUMENTS 675420  5/1966  Belgium .

Primary Examiner—Jenna L. Davis
Attorney, Agent, or Firm—Hill, Steadman & Simpson

[57] ABSTRACT

A UV curable adhesive composition contains a C4 to C14 alkyl alcohol-acrylic acid ester monomer and a monofunctional oligoester acrylate. The composition is cured with UV rays to produce an adhesive the glass transition temperature of which is to be lower than −20° C. Preferably, the composition also contains glass powders and/or polyolefin powders. A double-face adhesive tape includes two porous base sheets in an adhesive layer produced on curing a UV curable adhesive composition.

6 Claims, 1 Drawing Sheet

ADHESIVE AND DOUBLE-SIDED ADHESIVE TAPE

BACKGROUND OF THE INVENTION

This invention relates to a UV curable adhesive composition, an adhesive obtained on curing the UV curable adhesive composition, and a double-face adhesive tape having a layer of such adhesive.

There has hitherto been employed, as an adhesive layer for a double-face adhesive tape, an adhesive obtained on curing an acrylic adhesive composition. Such acrylic adhesive composition usually contains, as main component, an acrylic acid ester of an alkyl alcohol having 4 to 14 carbon atoms. A cured product of the acrylic acid ester is poor in cohesion, although it has a glass transition temperature of −60° to −40° C. and superior tackiness as an adhesive.

Consequently, several other monomers are contained in the acrylic adhesive composition of improving both adhesion and cohesion in a balanced manner. Examples of these monomers include (i) an ester of lower alcohols and acrylic or methacrylic acid, such as methyl acrylate, ethyl acrylate, propyl acrylate, methyl methacrylate or ethyl methacrylate, (ii) vinyl monomers, such as vinyl acetate or vinylidene chloride, and (iii) monomers containing reactive groups, such as acrylic acid, methacrylic acid, hydroxy ethyl acrylate, hydroxy propyl acrylate, hydroxy ethyl methacrylate, hydroxy propyl methacrylate, glycidyl methacrylate, N-methylol acrylamide and diacetone acrylamide.

Such acrylic adhesive composition, composed of these monomers and the above-mentioned acrylic acid ester of the alkyl alcohol, is prepared into e.g. a coatable adhesive by polymerization by solution polymerization or emulsion polymerization followed by curing on addition of a cross-liking agent.

However, since the solvent or water need to be scattered off during the curing process, a large quantity of the heat energy is required. Besides, it is necessary to take measures against environmental pollution such as by solvent recovery or disposal of exhaust gases.

Consequently, there have been proposed, as a solution-free adhesive which may be produced without employing the solvent, an adhesive which may be produced on radiating ultraviolet rays to an adhesive composition composed of an alkyl alcohol-acrylic acid ester monomer and components copolymerizable therewith, and an adhesive tape prepared from such adhesive (Belgium, 675,420, 5/1966). In such case, acrylic acid esters of lower alcohols or alkyl alcohols having 4 to 14 carbon atoms, such as methyl acrylate or ethyl acrylate, are employed as monomer components curable by UV rays.

However, since methyl acrylate or ethyl acrylate have low boiling point and a strong smell, problems are raised in handling and labor safety if such compounds are used as monomer components of solvent-free adhesive. Besides, the adhesive obtained on curing the composition composed of base monomers by irradiation with UV rays also exhibits a strong disagreeable smell. Meanwhile, among the monomer components of the adhesive in which a solvent is used during curing, methacrylates such as methyl methacrylate, vinyl acetate, as a vinyl monomer, and an acrylic amide monomer, are not polymerized by UV rays, so that these can not be employed as monomer components of the solvent-free adhesive.

On the other hand, in producing a double-face adhesive tape, it is desirable that adhesive strength be improved in such a manner that the phenomenon of destruction of adhesion between the adhesive and an article to be stuck is not the interfacial peeling occurring at an interface therebetween but is the destruction of cohesion in which the adhesive layer of the adhesive tape itself is destroyed. To this end, it is desirable to increase the thickness of the adhesive layer.

It is however difficult to form a thick adhesive layer of an adhesive tape by employing a conventional adhesive which employs a solvent for curing, That is, it is difficult to form a thick adhesive layer by a method consisting in coating an adhesive composition obtained by solution polymerization or emulsion polymerization on a tape-shaped base sheet and vaporizing the solvent or water.

There is also known a method consisting in employing a hot melt adhesive as an adhesive and molding it into a tape by an extruder for forming a thick adhesive layer. However, the adhesive tape produced in this manner is low in thermal resistance and in operability due to sticking when formed into a tape.

These problems may be overcome by employing a solvent-free adhesive obtained on curing with UV rays. However, if the adhesive layer is increased in thickness, the adhesive tends to be stuck to a blade of a metal mold or a creel-shaped mold during pinching. Besides, if the adhesive layer is increased in thickness, the adhesive tends to be exuded when the double-face tape is coiled into a roll, with the exuded adhesive being stuck to itself to render it impossible to rewind and re-use the tape. Besides, there is raised a problem of differential adhesive strength between an irradiated surface and a non-irradiated surface of an adhesive tape being prepared. That is, a transparent polyester film processed by a releasing treatment so as to be peeled off is laminated on the surface of a double-face tape irradiated with the UV rays, while a release paper is provided on the reverse surface of the tape with an adhesive layer inbetween, so that the reverse surface is not irradiated with UV Rays and hence the adhesive strength on the reverse surface becomes lower than that on the front surface. If the UV rays are adapted to be radiated onto both the top and bottom surfaces of the adhesive tape in order to cope with the differential adhesive strength, it becomes necessary to provide a complicated equipment.

SUMMARY OF THE INVENTION

It is an object of the present invention to provide an adhesive exhibiting high cohesion and high adhesion in a balanced manner and a low smell, as an adhesive obtained on polymerization with UV rays.

It is another object of the present invention to provide a double-face adhesive tape of a heavy thickness using such adhesive, in which the tape exhibits cuttability and the adhesive tape is unlikely to be stuck to a blade of a metal mold or a steel rule dye for cutting.

It is a further object of the present invention to provide a double-face adhesive tape in which a differential adhesive strength is not produced between the irradiated and the non-irradiated reverse surface of the tape.

It is yet another object of the present invention to provide a double-face adhesive tape in which the adhesive is not exuded when the tape is wound into a roll.

The present inventor has found that, if a monofunctional oligoester acrylate is used as monomer component of the UV curable adhesive, in addition to an acrylic acid ester of an alkyl alcohol having 4 to 14 carbon atoms, such oligoester acrylate causing the glass transition temperature of the adhesive, as a UV cured product, to be not higher than −20° C., the adhesive may be diminished in smell and exhibit well-balanced cohesion and adhesion, that, if glass powders and/or polyolefin powders are added in the UV curable adhesive composition, the adhesive produced on curing the composition with UV rays is improved in cuttability, while the irradiated surface and the reverse surface of the composition exhibit substantially equal adhesive strength, and that, if two porous base sheets are provided in the adhesive layer in producing the double-face adhesive tape using the UV curable adhesive composition admixed with the glass powders and/or polyolefin powders, the adhesive may be prevented from being exuded on coiling the side faces of the tape into a roll even although the adhesive layer in the adhesive tape has an increased thickness. These findings have led to accomplishment of the present invention.

In its first aspect, the present invention provides an adhesive produced on curing a UV curable adhesive composition composed of a monomer of an acrylic acid ester of an alkyl alcohol having 4 to 14 carbon atoms, and a monofunctional oligoester acrylate, with UV rays, such adhesive having a glass transition temperature of −20° C.

In its second aspect, the present invention provides a compound UV curable adhesive composition composed of a UV curable adhesive composition and glass powders and/or polyolefin powders.

In its third aspect, the present invention provides a double-face adhesive tape comprising a first adhesive layer between two porous base sheets, said adhesive layer being produced on curing the compound UV curable adhesive composition in the second aspect of the present invention with UV rays, and a second adhesive layer outside the porous base sheets, the second adhesive layer being produced on curing the compound UV curable adhesive composition with UV rays or on curing a UV curable adhesive composition substantially free of glass powders and/or polyolefin powders with UV rays.

The present invention also provides a method for producing the double-face adhesive tape in the third aspect comprising superposing a first porous base sheet on a first release sheet, coating the compound UV curable adhesive composition on the first porous base sheet, superposing a second porous base sheet and a second release sheet on the compound UV curable adhesive composition, laminating the adhesive layer on the first release sheet to the adhesive layer on the second release sheet by pressure application, and subsequently irradiating the assembly with UV rays for curing compound UV curable adhesive composition.

The adhesive tape in the first aspect of the present invention is produced on curing a UV curable adhesive composition comprising an acrylic acid ester of an alkyl alcohol having 4 to 14 carbon atoms and a monofunctional oligoester acrylate with UV rays. Since the monofunctional oligoester acrylate is superior in UV curability, the resulting adhesive exhibits high cohesion and high adhesion in a well-balanced manner. The adhesive inter alia exhibits well-balanced cohesion and adhesion at elevated temperatures, while being superior in thermal resistance. In addition, since the adhesive produced in accordance with the present invention has a glass transition temperature of not higher than −20° C., it has superior adhesion at ambient temperature.

Besides, since the adhesive produced in accordance with the present invention exhibits high a polymerization rate owing to the superior UV curability of the monofunctional oligoester acrylate, the problem related to the smell due to the monomer content may be resolved to promote ease in handling and labor safety.

Since the compound UV curable adhesive composition in the second aspect of the present invention contains glass powders and/or polyolefin powders, the adhesive produced on curing the composition by irradiation of the UV rays may be improved in cutting characteristics. Besides, since the UV rays are allowed to reach the reverse surface opposite to the irradiated surface of the composition, it becomes possible to eliminate any substantial difference in the adhesive strength between the irradiated surface and the non-irradiated reverse surface.

Since the double-face adhesive tape in the third aspect of the present invention contains two porous base sheets in the adhesive layer, it becomes possible to prevent the adhesive layer from being exuded when the double-face adhesive tape is coiled into a roll, even if the adhesive heavy is of a larger thickness. It becomes possible in this manner to form the adhesive layer to a heavy thickness so that the phenomenon of adhesion destruction between the articles to be stuck together and the adhesive becomes a cohesion destruction of the adhesive layer sandwiched between the two porous base sheets, thereby improving the adhesion strength.

DETAILED DESCRIPTION OF THE INVENTION

Figure 1A:
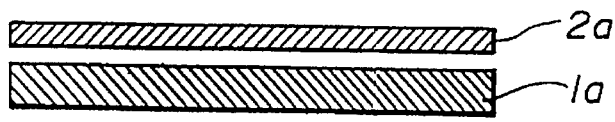
FIG. 1 is a schematic cross-sectional view for illustrating a process for producing a double-face adhesive sheet step by step.

The adhesive according to the first subject-matter of the invention is produced by preparing a UV curable adhesive composition from an acrylic acid ester with an alkyl alcohol having 4 to 14 carbon atoms as a monomer and a monofunctional oligoester acrylate and curing the composition with UV rays. As the acrylic acid ester monomers, acrylic acid esters with alkyl alcohol having 4 to 14 carbon atoms, customarily employed for the UV curable adhesive composition, such as butyl acrylate, 2-ethyl hexyl acrylate, isooctyl acrylate, nonyl acrylate or decyl acrylate, may be employed.

As the monofunctional oligoester acrylate, those which will cause the glass transition temperature of an adhesive obtained on curing the UV curable adhesive composition to be less than −20° C. are employed. As these monofunctional oligoester acrylates, those having the chemical formulas A-M or A-M-N, where A, M and N denote acrylic acid, divalent alcohol and dibasic acid, respectively, may be employed. Specifically, the monofunctional oligoester acrylates having the formula A-M may be exemplified by 2-hydroxypropylphenylether acrylates produced from 2,3-dihydroxypropyl phenylether and acrylic acid. On the other hand, the monofunctional oligoester acrylates having the formula A-M-N may be exemplified by dihydric alcohols, such as ethylene glycol , propylene glycol, neopentyl alcohol, 1,3-butanediol, 1,6-hexanediol or hydrogenated bisphenol A, and oligoester acrylates produced from dibasic acids such as succinic acid, adipic acid, phthalic anhydride or terephthalic acid, and acrylic acids, such as succinic acid monohydroxyethyl acrylate or phthalic acid monohydroxyethyl acrylate.

The proportions of the monofunctional oligoester acrylate and the acrylic acid esters with alkyl alcohol with 4 to 14 carbon atoms are those which will provide a glass transition temperature of the adhesive obtained on curing the UV curable adhesive composition with UV rays of lower than −20° C. Typical of the proportions is not more than 100 parts by weight of oligoester acrylate to 1000 parts by weight of the acrylic acid ester monomer, depending on the types of the oligoester acrylates employed. By incorporation of the oligoester acrylate, the UV curable adhesive composition is improved in UV curability and adhesive cohesion. However, if the oligoester acrylate is added in excess, the adhesive is lowered in tackiness.

In producing the adhesive of the present invention, a polyfunctional acrylic acid ester monomer having a molecular weight of not less than 300 and/or an oligomer may be added the UV curable adhesive composition. For example, polyalkylene glycol diacrylates, such as Enneaethylene glycol diacrylate, manufactured by SHTN-NAKAHURA KAGAKU KK under the trade name of NK Ester A-400, or tetradecaethylene glycol diacrylate, manufactured by SHIN-NAKANURA KAGAKU KK under the trade name of NK Ester A-600, ethylene oxide modified bisphenol A diacrylate, manufactured by KYOEISHA YUSHT KAGAKU KK under the trade name of BP-4EA, propylene oxide modified bisphenol A diacrylate, manufactured by KYOEISHA YUSHT KAGAKU KK under the trade name of BP-4PA, ethylene oxide modified trimethylolpropane triacrylate, manufactured by KYOETSHA YUSHT KAGAKU KK under the trade name of TMP-6EO-3A, hydroxy pivalic acid neopentyl glycol acrylate, manufactured by NIPPON KAYAKU KK under the trade name of KAYARAD MANDA, and derivatives thereof, manufactured by NIPPON KAYAKU KK under the trade names of KAYARAD HX-220 and KAYARAD HX-620, may be employed. Oligourethane acrylates may also be employed.

For producing the adhesive according to the present invention, additives, such as a photopolymerization initiator, may be added in the UV curable adhesive composition. An acrylic rubber may also be added for improving the viscosity of the UV curable adhesive composition and improving its coating properties, The compound UV curable adhesive composition according to the present invention is a composition for producing an adhesive on curing with UV rays and is characterized in that it contains the UV curable adhesive composition and glass powders and/or polyolefin powders, By employing both the glass powders and/or polyolefin powders, it becomes possible to improve punchability of the adhesive produced on irradiating the UV curable adhesive composition with UV rays as well as to eliminate any substantial difference in the adhesive strength on the irradiated surface and that on the non-irradiated or reverse surface, In such case, it is preferred to employ the glass powders capable of transmitting a light having a wavelength of not less than 200 nm, while it is more preferred to employ the quartz powders not absorbing the UV rays, These powders are preferably spherical in shape, although the powders in the form of extremely fine particles may be mixed therein. It is preferred for the particle size to be small and is usually 100 μm or less and more preferably 50 μm or less. If the particle size is larger, the adhesive obtained on curing the composition is lowered in surface smoothness. The glass powders are preferably employed in an amount of 5 to 20 parts by volume to 100 parts by volume of the UV curable adhesive composition. It is noted that the parts by volume are values as calculated on the basis of the true specific gravity of the powders. If the glass powders are employed in an amount less than 5 parts by volume, the UV rays cannot be transmitted sufficiently through the adhesive, such that, when the adhesive layer is formed to a thickness e.g. of 0.1 mm, the adhesive strength on the front surface tends to be different from that on the reverse surface. On the other hand, if the glass powders are added in an amount exceeding 20 parts by volume, the produced adhesive tends to be solidified t lower the adhesive strength.

Preferably, the polyolefin powders are capable of allowing the light having a wavelength of approximately 350 nm or more to be transmitted therethrough, and formed of pulverulent polyethylene or polypropylene. Host preferred are ultra-high molecular weight polyethylene powders because of high thermal resistance thereof. The particle size of the polyolefin powders is preferably small as is that of the glass powders, and is usually 100 μm or less and more preferably 50 μm or less. Preferably, the polyolefin powders are employed in an amount of to 20 parts by volume to 100 parts by volume of the UV curable adhesive composition. If the amount of the polyolefin powders is less than 5 parts by volume, the composition is hardened so that it becomes difficult to improve the punchability of the resulting adhesive significantly. On the other hand, if it exceeds 20 parts by volume, the resulting adhesive becomes solid to lower the adhesive strength.

It is therefore preferred to use both the glass powders and the polyolefin powders in combination. The preferred amounts are 5 to 20 parts by volume of the glass powders and 5 to 20 parts by volume of the polyolefin powders to 10 parts by volume of the UV curable adhesive composition, with the sum of the amounts of the glass powders and the polyolefin powders being not more than 30 parts by volume.

As the UV curable adhesive composition employed in the compound UV curable adhesive composition according to the second subject-matter of the present invention, a wide variety of adhesive compositions which may be cured by employing the UV rays with or without heat may be employed. Preferably, the UV curable adhesive composition employed for producing the adhesive composition of the first subject-matter of the present invention may be employed. That is, the favorable effect of the second subject-matter of the present invention may be realized by employing the conventional UV curable adhesive composition curable by UV rays with or without heat in combination with the glass powders or polyolefin powders, the favorable effects proper to the first subject matter and the second subject-matter of the present invention may be desirably achieved by employing the UV curable Adhesive composition employed for producing the adhesive according to the first subject-matter of the present invention.

The double-face adhesive tape according to the third subject-matter of the present invention is a double-face adhesive tape prepared from the above-mentioned compound UV curable adhesive composition. It is possible with the present double-face adhesive tape to from the adhesive layer to a larger thickness so that the adhesive is not exuded even if the tape is wound tightly in the form of a roll.

Figure 1B:
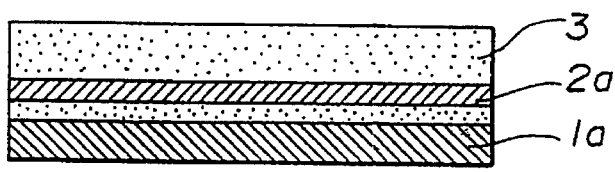
Figure 1C:
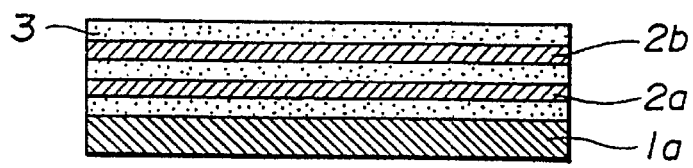
Figure 1D:
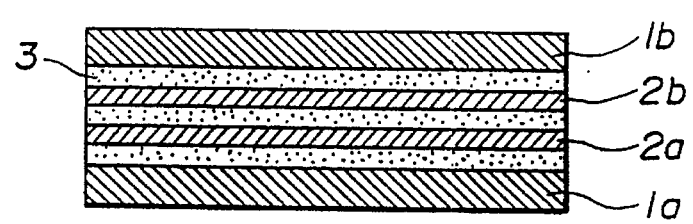
Figure 1E:
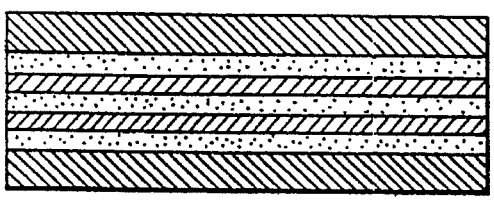
Figure 1F:
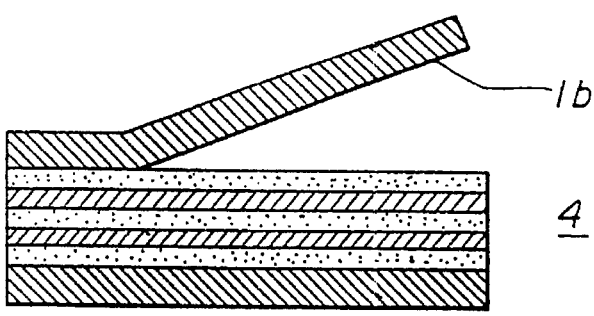

The double-face adhesive tape may be produced by the method shown in FIG. 1. First, a first porous base 2a is superposed on a first release sheet 1a, as shown at (a) in FIG. 1. A compound UV curable resin composition 3. is then coated on the first porous base 2a. This causes the compound UV curable resin composition 3 to be impregnated into the first porous base 2a, as shown at (b) in FIG. 1. Then, a second porous base 2b is superposed on the coated layer of the UV curable adhesive composition 3, as shown at (c) in FIG. 1. It is preferred for air not to be entrained by the second porous base 2b. A second release sheet 1b is superposed thereon and the overall thickness of the assembly from the first release sheet 1a to the second release sheet 1b is rendered uniform by pressure application, as shown at (d) in FIG. 1. It is similarly preferred for air not to be entrained during superposition of the second release sheet 1b. When coiling the double-face adhesive tape 4, it is preferred to coil the tape 4 into a roll as the second release sheet 1b irradiated with the UV rays is peeled off, as shown at (f) in FIG. 1. When producing a punched product of the double-face adhesive tape 4 from the roll, a release sheet processed by a releasing treatment may be laminated before punching on the adhesive layer from which the second release sheet 1b has been peeled off.

With the double-face adhesive tape, prepared in this manner, a larger amount of the glass powders or the polyolefin powders are present between the two porous base sheets 2a, 2b, whereas the amount of the glass powders or the polyolefin powders present between the release sheet 1a and the porous base sheet 2a and between the release sheet 1b and the porous sheet 2b is substantially less than that present between the porous base sheets 2a, 2b, or substantially nil.

It is noted that the first release sheet 1a may be of paper or polymer film, while the second release sheet 1b may be such a release sheet as is capable of transmitting UV rays therethrough and may be preferably formed by a polyester film, 25 to 75 pm in thickness, processed such as with silicone by a releasing treatment.

As the first porous base sheet 2a and the second porous base sheet 2b, such sheets capable of impregnating the UV curable adhesive composition may be employed. The pore size is preferably not more than the mean particle size of the glass or polyolefin powders. In this manner, the glass or polyolefin powders having a smaller particle size can be transmitted through the base sheets, while those having a larger particle size can not be transmitted through the base sheets. These base sheets may be formed y synthetic fibers, natural fibers or non-woven fabrics, above all, non-woven fabrics composed of hemp and rayon.

The compound UV curable adhesive composition according to the second subject-matter of the present invention is employed as the adhesive composition to be impregnated in the base sheet. Above all, in order for the adhesive composition to be impregnated readily into the base material, it is preferred to employ such adhesive composition having sa low viscosity at the time of coating on the base sheet, preferably a viscosity at time of application of the order of 500 to 3,000 cps. If need be, suitable solvents may be mixed into the compound UV curable adhesive composition.

The total thickness L of the adhesive layers of the resulting double-face adhesive tape 4 is given by $$L=L_1+L_2+L_3+L_4\times2$$

where $L_1$, $L_2$, $L_3$, and $L_4$ denote the thickness of the adhesive layer sandwiched between the porous base sheets 2a, 2b, the thickness of the adhesive layer sandwiched between the first release sheet 1a and the first porous base sheet 2a, the thickness of the adhesive layer sandwiched between the second release sheet 1b and the second porous base sheet 2b and the first porous base sheet 2a and that of the second porous base sheet 2b, respectively. This total thickness L of the adhesive layers is preferably 200 µm to 2 mm.

The present invention will be explained in more detail with reference to Examples.

EXAMPLE 1

1,000 g of a mixed monomer solution, consisting of 900 g of 2-ethyl hexyl acrylate and 100 g of acrylic acid, and 70 g of acrylic rubber, manufactured by TOA PAINT KK under the trade name of "Toacron PS220", were agitated for 48 hours in a vessel fitted with an agitator for dissolution. Subsequently, 50 g of 2-hydroxypropyl phenylether acrylate and 2.0 g of 2-hydroxy-2-methyl-1-phenylpropane-1-1, a photopolymerization initiator manufactured by MERCK INC. under the trade name of Dalocure 1173, were added to the reaction system and stirred to a UV curable adhesive composition having a viscosity of 2500 cps. The composition had no disagreeable smell.

The resulting UV curable adhesive composition was coated on a release sheet, with a coater knife gap set to 40 µm. A polyester film, 50 µm in thickness, processed by a releasing treatment, was applied thereon and irradiated with UV rays for curing the coated composition for producing an adhesive in the form of a double-face adhesive tape. The UV rays were radiated, using an ozone-fee metal halide lamp having an input of 160 W/cm and a length of 50 cm, in such a manner that short wavelength UV rays are interrupted and the UV rays with 1 J/cm$^2$ dosage were radiated from a height of 20 cm through a heat ray reflecting filter.

The polymerization rate, glass transition temperature Tg, cohesion, adhesion and tackiness of the resulting adhesive samples were measured in the following manner. The results of measurement are shown in Table 1.

Measurement of Polymerization Rate 0.5 g of an adhesive, cured by UV rays, was weighed out and allowed to stand for one hour at 100° C. at a pressure of 7 mmHg to remove the residual monomer. The adhesive wa again weighed out to find the weight of the residual monomer removed. Besides, the polymerization rate was found by the formula (Polymerization Rate)=(Weight of Residual Monomer/Weight of Charged Monomer)×100

Measurement of Glass Transition Temperature Tg

The glass transition temperature Tg was measured using a vibron manufactured by ORIENTEC KK under the trade name of DDV-01FP. Measurement was made for the range of from −100° to 50° C. under the tensile load and an amplitude of oscillation of 16 pro, with the sample length, width and thickness of 30 mm, 4 mm and 0.4 mm, respectively. The glass temperature was found from the results at the oscillation amplitude of 3.5 Hz.

Measurement of Cohesion

Cohesion measurement was carried out in accordance with the method for measuring the holding power as prescribed in JIS Z 0237. As articles to be bound to each other, a stainless steel plate, 2 mm in thickness, ground with a No. 280 sand paper, and an aluminum foil 0.05 mm in thickness, were used, with an adhesion area of 25 mm×25 mm. After sticking by the adhesive, a load of 1 Kgf was applied at 150° C. perpendicularly to the articles, which are then allowed to stand for one hour to measure the extent of deviation incurred at the bound site.

Measurement of Adhesive Strength

As articles to be bound to each other, a stainless steel plate, 2 mm in thickness, ground with a No. 280 sand paper, and an aluminum foil 0.05 mm in thickness, were used. After sticking with the adhesive, these articles were allowed to stand for 24 hours at 23° or 150° C. The articles stuck together in this manner were cut to bands each having a width of 10 mm and peeled in a 90° direction at a tensile speed of 300 mm/min for measuring the adhesive strength.

Measurement of Tackiness

Measurement of tackiness was carried out in accordance with the method of tack measurement (ball rolling method) as prescribed in JZS Z 0237. That is, an adhesive cut to length of 250 mm and to width of 15 mm was bonded to a tilted plate, having a tilt of 30°, with a release sheet being peeled off. After the assembly was allowed to stand at 23° C. for two hours, the polyester film, processed by a releasing treatment, was peeled off, and tackiness was measured of the surface irradiated with the UV rays.

EXAMPLE 2

A UV curable adhesive composition was prepared in the same manner as in Example 1, except using 100 g of 2-hydroxypropyl phenylether acrylate, to produce a UV curable adhesive composition. The composition had no disagreeable smell.

The resulting UV curable adhesive composition was cured in the same way as in Example 1 to produce an adhesive in the form of a double-face adhesive tape, and measurements were made of the polymerization rate, glass transition temperature Tg, cohesion, adhesion and tackiness of the resulting adhesive samples. The results are shown in Table 1.

EXAMPLE 3

A UV curable adhesive composition was prepared in the same manner as in Example 1, except using 150 g of 2-hydroxypropyl phenylether acrylate, to produce a UV curable adhesive composition. The composition had no disagreeable smell.

The resulting UV curable adhesive composition was cured in the same way as in Example 1 to produce an adhesive in the form of a double-face adhesive tape, and measurements were made of the polymerization rate, glass transition temperature Tg, cohesion, adhesion and tackiness of the resulting adhesive samples. The results are shown in Table 1.

EXAMPLE 4

1,000 g of a mixed monomer solution, consisting of 475 g of 2-ethyl hexyl acrylate, 475 g of butyl acrylate and 50 g of acrylic acid, and 70 g of acrylic rubber, manufactured by TOA PAINT KK under the trade name of "Toacron PSb 220", were agitated for 48 hours in a vessel fitted with an agitator for dissolution. Subsequently, 50 g of 2-hydroxypropyl phenylether acrylate and 2.0 g of 2-hydroxy-2-methyl-1-phenyl propane-one, a photopolymerization initiator manufactured by MERCK INC. under the trade name of Dalocure 1173, were added to the reaction system and stirred to a UV curable adhesive composition having a viscosity of 2500 cps. The composition had no disagreeable smell.

The resulting UV curable adhesive composition was cured in the same way as in Example b 1to produce an adhesive in the form of a double-face adhesive tape, and measurements were made of the polymerization rate, glass transition temperature Tg, cohesion, adhesion and tackiness of the resulting adhesive samples. The results are shown i n Table 1.

EXAMPLE 5

1,000 g of a mixed monomer solution, consisting of 850 g of 2-ethyl hexyl acrylate, 80 g of acrylic acid and 70 g of N-vinyl-2-pyrrolidone, and 70 g of acrylic rubber, manufactured by TOA PAINT KK under the trade name of "Toacron PS220", were agitated for 48 hours in a vessel fitted with an agitator for dissolution. Then, 100 g of succinic acid monohydroxyethyl acrylate, 1.56 g (0.005 mol) of hydroxypivalic acid neopentylglycol diacrylate. as a polyfunctional oligoacrylate, and an initiator, were added to the reaction system, and agitated to produce a UV curable adhesive composition. The composition had no disagreeable smell.

The resulting UV curable adhesive composition was cured in the same way as in Example 1 to produce an adhesive in the form of a double-face adhesive tape, and measurements were made of the polymerization rate, glass transition temperature Tg, cohesion, adhesion and tackiness of the resulting adhesive samples. The results are shown in Table 1.

Comparative Example 1

A UV curable adhesive composition was produced in the same way as in Example 1, except using 200 g of 2-hydroxypropyl phenylether acrylate. Using the UV curable adhesive composition, the composition was cured in the form of a double-face adhesive tape, and measurements were made of the polymerization rate, glass transition temperature Tg and tackiness of the resulting cured products. The results are shown in Table 1. These cured products had the tackiness of 2/32 and were totally lacking in the functions desired of the adhesive.

Comparative Example 2

A UV curable adhesive composition was produced in the same way as in Example 1, except using 150 g of 2-hydroxypropyl phenylether acrylate. Using the UV curable adhesive composition, the composition was cured in the form of a double-face adhesive tape, and measurements were made of the polymerization rate, glass transition temperature Tg and tackiness of the resulting cured products. These cured products had the tackiness of 0/32 and were totally lacking in the functions desired of the adhesive.

TABLE 1

|  | oligoester acrylate [g] | polymerization rate [%] | Tg [°C.] | cohesion [mm] | adhesion (23° C.) [Kgf/cm] | (150°) | tackiness |
|---|---|---|---|---|---|---|---|
| Ex. 1 | 50(*1) | 99.2 | −35.5 | 3.0 | 2.8 | 0.9 | 16/32 |
| Ex. 2 | 100(*1) | 99.2 | −27.5 | 2.5 | 3.2 | 1.2 | 15/30 |
| Ex. 3 | 150(*1) | 99.5 | −22.6 | 2.5 | 3.3 | 1.25 | 7/32 |
| Ex. 4 | 75(*2) | 99.5 | −25.0 | 3.5 | 3.5 | 1.1 | 12/30 |
| Ex. 5 | 100(*3) | 99.5 | −28.0 | 0.0 | 3.0 | 1.3 | 9/32 |
| Comp. | 200(*1) | 99.5 | −17.5 |  |  |  | 2/32 |

TABLE 1-continued

| | oligoester acrylate [g] | polymeriza- tion rate [%] | Tg [°C.] | cohesion [mm] | adhesion (23° C.) [Kgf/cm] | (150°) | tackiness |
|---|---|---|---|---|---|---|---|
| Ex. 1 Comp. Ex. 2 | 150(*2) | 99.6 | −15.5 | | | | 0/32 |

Notes:
(*1) 2-hydroxypropylphenylether acrylate
(*2) phthalic acid monohydroxy ethyl acrylate
(*3) succinic acid monohydroxy ethyl acrylate It can be seen from Table 1 that t, he UV curable adhesive samples of the Examples having the glass transition temperature of not higher than −20° C. exhibit, high cohesion and adhesive strength, and are excellent above all in the adhesive strength at elevated temperatures and in thermal resistance.

EXAMPLE 6

The compound UV curable adhesive composition was prepared by following the same procedure as in Example 2, except that, in Example 2, after addition of the photopolymerization initiator, 51.7 g (5 vol %) of polyolefin powders "Miperon XM-220" manufactured by MITSUI PETROCHEMICALS CO. LTD., having a mean particle size of 30 μm and a specific gravity of 0.94, and 275 g (10 vol .%) of glass powders "FGB-300, manufactured by FUJ: SEZSAKUSHO KK, mean particle size of 50 μm and a specific gravity of 2.5, were added and the resulting mixture allowed to stand and defoamed after thorough mixing. The resulting composition was irradiated with UV rays and cured in the form of a double-face adhesive tape.

The adhesive layer, obtained on curing the composition, had a thickness of 0.4 mm, and had a smooth surface. The adhesive layer was sandwiched between a polyester film processed with a releasing treatment and a release paper, and the tape was cut in this state with a steel rule die composed of a steel blade fixed on a board. 100 shots of circles 20 mm in diameter were drawn in succession. No adhesive was seen to have adhered to the blade. The adhesive strength of the irradiated surface and that of the non-irradiated reverse surface were measured in the same way as in Example 1. the results are shown in Table 2.

For reference, the cured product produced in Example 2 was cut using a steel rule die. It, was seen that an adhesive was stuck to the blade of the steel rule die. The adhesive strength of the irradiated surface was found to be 2.95 kgf/cm, whereas that of the reverse surface was found to be 1.85 kgf/cm.

EXAMPLES 7 and 8

A compound UV curable adhesive composition was produced in the same way as in Example 6, except using the polyolefin powders in amounts shown in Table 2. The composition was irradiated with UV rays for being cured in the form of double-face adhesive tapes. The composition was cut by a steel rule die for checking he possible adhesion of the adhesive to the blade, and measurements were made of the adhesive strength on the irradiated surface and that on the reverse surface. The results are shown in Table 2.

TABLE 2

| | amount of addition of polyolefin powders [g] | adhesive deposition on steel rule die | adhesion strength irradiated surface | reverse surface |
|---|---|---|---|---|
| | | | [Kgf/cm] | |
| Ex. 6 | 51.7 ( 5 vol %) | none | 3.25 | 3.00 |
| Ex. 7 | 155.1 (15 vol %) | none | 3.15 | 3.00 |
| Ex. 8 | 206.8 (20 vol %) | none | 2.95 | 2.80 |

EXAMPLES 9 to 11

A compound UV curable adhesive composition was produced in the same way as in Example 6, except using the polyolefin powders in amounts shown in Table 3. The composition was irradiated with UV rays for being cured in the form of double-face adhesive tapes. The composition was cut by a steel rule die, and measurements were made of the adhesive strength on the irradiated surface and that on the reverse surface. The results are shown in Table 3.

TABLE 3

| | amount of addition of polyolefin powders [g] | adhesive deposition on steel rule die | adhesion strength irradiated surface | reverse surface |
|---|---|---|---|---|
| | | | [Kgf/cm] | |
| Ex. 9 | 137.5 ( 5 vol %) | none | 3.05 | 2.85 |
| Ex. 10 | 412.5 (15 vol %) | none | 3.20 | 3.20 |
| Ex. 11 | 550.0 (20 vol %) | none | 2.80 | 2.85 |

EXAMPLE 12

A compound UV curable adhesive composition was produced in the same way as in Example 6, except using 103.6 g (10 vol. %) of the polyolefin powders and 687.5 g (25 vol %) of glass powders. The composition was irradiated with UV rays for being cured in the form of double-face adhesive tapes. The composition was drawn by a steel rule die, mold, and measurements were made of the adhesive strength on the irradiated surface and that on the reverse surface. It was found that, although no adhesive was affixed to the steel rule die, the adhesive layer became harder, and was lower in adhesive strength than in Example 6.

It was found from the results of Tables 2 and 3 that, by incorporating the polyolefin powders and the glass powders in the UV curable adhesive composition, the resulting adhesive could be improved in cuttability and the difference in adhesive strength between the irradiated surface and the reverse surface can be substantially eliminated, and that, if the combined amount of the polyolefin powders and the glass powders is not more than 30 vol % to 100 vol % of the UV curable adhesive composition, the adhesive is not harder and exhibits superior adhesive strength.

EXAMPLE 13

1,000 g of a mixed monomer solution, consisting of 95 mol % of 2-ethyl hexyl acrylate and 5 mol % of acrylic acid, and 50 g of acrylic rubber, manufactured by TOA PAINT KK under the trade name of "Toacron PS220", were agitated for 48 hours in a vessel fitted with an agitator for dissolution for producing a viscous solution having a viscosity of 1500 cps. Then, 100 g of 2-hydroxy propyl phenylether acrylate, 2.0 g of 2-hydroxy-2-methyl-1 -phenylpropane-1-one ("Dalocure 1173 manufactured by MERCK INC.) as a photopolymerization initiator and 5.0 g of benzoyl peroxide were added to the reaction system and polymerized by radical polymerization under application of heat and UV rays to produce a UV curable adhesive composition. Then, 103.6 g (10 vol %) of polyolefin powders ("Miperon XM-220 manufactured by MITSUI PETROCHEMICALS KK, mean particle size of 30 mm and specific gravity of 0.94) and 275 g (10 vol %) of glass powders ("FGB-300" manufactured by FUJI SEISAKUSHO KK, with a mean particle size of 50 μm and specific gravity of 2.5) were added to the reaction system and mixed thoroughly. The resulting mixture was allowed to stand and defoamed to a compound UV curable adhesive composition.

A non-woven fabric, about 20 μm in thickness, was placed on polyester film, 50 μm in thickness, having its both sides processed by a releasing treatment with silicone, and the above-mentioned compound UV curable adhesive composition was coated thereon to a thickness of approximately 0.4 mm. This caused the compound UV curable adhesive composition to be exuded onto the non-woven fabric. A polyester film 50 μm in thickness, having its one surface processed with releasing treatment with silicone, was placed on the resulting assembly, and the adhesive layer was adjusted to a thickness of 0.4 mm. UV rays of 2J/cm$^2$ dosage was radiated on the polyester film, having its one surface processed with silicone as described above, from a height of 20 cm. The compound UV curable adhesive composition was heated to a temperature of 90° C. and cured to an adhesive to give a double-face adhesive tape.

The cross-section of the double-face adhesive tape thus prepared was examined over a magnifying lens. It was found that the total thickness of the adhesive layer was 0.4 mm, the thickness of the adhesive layer, surrounded by two non-woven fabrics, was 0.2 mm and the thicknesses of the adhesive layers which were exuded from the upper and lower non-woven fabrics were each 0.06 mm.

The adhesive layer of the double-face adhesive tape was sandwiched between a polyester film processed with a releasing treatment and are release paper and the tape was drawn in this state with a steel rule die. 100 shots of circles 20 mm in diameter were drawn in succession. No adhesive was seen to have adhered to the blade.

The adhesive strength on the irradiated surface and that on the reverse surface were measured in the same way as in Example 1, with the temperature of allowing to stand for 24 hours after adhesion being 23° C. It was fond that the adhesive strength on the irradiated surface was 2.85 kgf/cm, while that on the reverse surface was 2.80 kgf/cm, so that there was no substantial difference between the adhesive strength on the front surface and that on the reverse surface,

What is claimed is:

1. A UV curable adhesive composition comprising:
   (a) an acrylic acid ester of an alkyl alcohol having 4 to 14 carbon atoms;
   (b) a monofunctional oligoester acrylate having a formula selected from the group consisting of A-M and A-M-N, wherein A represents an acrylic acid moiety, M is a dihydric alcohol moiety, and N is a dibasic acid moiety;
   (c) a photopolymerization initiator; and
   (d) a powder selected from the group consisting of glass powders, polyolefin powders and mixtures of glass powders and polyolefin powders, said curable composition being substantially solvent-free and having a glass transition temperature of less than about −20° C.

2. The UV curable adhesive as claimed in claim 1 containing 5 to 20 parts by volume of glass powders and 5 to 20 parts by volume of polyolefin powders, with the sum of the glass powders and the polyolefin powders being not more than 30 parts by volume.

3. A UV curable adhesive composition as defined in claim 1, wherein component (b) comprises 2-hydroxypropylphenylether acrylate.

4. A UV curable adhesive composition as defined in claim 1, wherein component (b) comprises succinic acid monohydroxyethyl acrylate.

5. A UV curable adhesive composition as defined in claim 1, wherein component (b) comprises phthalic acid monohydroxyethyl acrylate.

6. A UV curable adhesive composition comprising:
   (a) an acrylic acid ester of an alkyl alcohol having 4 to 14 carbon atoms;
   (b) a monofunctional oligoester acrylate having a formula selected from the group consisting of A-M and A-M-N, wherein A represents an acrylic acid moiety, M is a dihydric alcohol moiety, and N is a dibasic acid moiety;
   (c) a photopolymerization initiator; and
   (d) an acrylic rubber modifier, said composition being substantially solvent-free and having a glass transition temperature of less than about −20° C.

* * * * *